United States Patent [19]
Langvik

[11] 4,180,461
[45] Dec. 25, 1979

[54] VACUUM SEPARATOR HAVING STAGGERED FILTRATE TUBES

[75] Inventor: Sigmund C. Langvik, Nesoeya, Norway

[73] Assignee: Scanmec A/S, Norway

[21] Appl. No.: 893,509

[22] Filed: Apr. 4, 1978

[51] Int. Cl.² ............................................. B01C 33/02
[52] U.S. Cl. ................................ 210/333 A; 210/345
[58] Field of Search ............... 210/333 R, 333 A, 334, 210/345

[56] References Cited

U.S. PATENT DOCUMENTS

| | | | |
|---|---|---|---|
| 3,409,134 | 11/1968 | Wallace et al. | 210/334 X |
| 3,557,959 | 1/1971 | Muller | 210/331 A |
| 4,032,442 | 6/1977 | Peterson | 210/333 R |

*Primary Examiner*—John Adee

[57] ABSTRACT

A vacuum separator which includes an air pressure source, at least a pair of filter discs, each of the filter discs including a plurality of filter sectors, and means for alternately connecting the air pressure source first to one of the filter sectors of one of the filter discs and subsequently to one of the filter sectors of the other of the filter discs.

14 Claims, 5 Drawing Figures

VACUUM SEPARATOR HAVING STAGGERED FILTRATE TUBES

BACKGROUND OF THE INVENTION

The invention relates generally to vacuum separators having vacuum filter discs or assemblies adapted for selective and periodic connection to a vacuum source and an air pressure source, and the filter discs being supported for rotation through a slurry for effecting separation of solid materials from the slurry. More particularly, the invention relates to an improved means for connecting the filter sectors of the filter discs to the air pressure source.

Prior art vacuum separators have included a rotating cylinder supporting a plurality of filter discs, each of the filter discs surrounding a portion of the cylinder and lying in a plane transverse to the cylinder axis. The filter discs are supported for rotation with the cylinder in such a manner that the filter discs are dipped into a slurry contained in a tank beneath the cylinder. The cylinder supports conduits which provide fluid communication between a vacuum source and the filter sectors of the filter discs whereby as the filter sectors move through the slurry, the slurry is drawn through the filters and solid particles suspended in the slurry may be caused to adhere to the filter. Means are further provided to selectively connect certain of the conduits and associated filter sectors to an air pressure source as the filter sectors reach a certain position in their rotational movement whereby air is blown through those conduits and through the filter sectors to cause the solid particles thereon to be blown away from the filter into a collecting means.

Frequently, a large number of filter discs are disposed in stacked parallel relation along the length of the cylinder and air pressure is simultaneously blown through one filter sector of each of those discs. To provide for efficient discharge of the solid particles from the surfaces of the filter sectors, the air pressure applied to the filter sectors should be maintained until all of the solid material coating the surface of the filter sectors is blown off. A premature reduction in air pressure results in those pores in the filter sectors which are initially blown clean transmitting airflow and the fine pores in the filter sectors are not blown out. This results in reduced efficiency of the vacuum separation process. Accordingly, it is critical that the air pressure applied to the filter sectors be maintained without reduction until all of the solid material covering the filter segments is discharged. As a result, prior art vacuum separators have commonly employed large air pressure tanks in an attempt to provide the required air pressure to the filter sectors for the necessary time period. However, even use of such large air pressure tanks has failed to provide a means for consistently and completely blowing the solid material off the filter sector surfaces.

SUMMARY OF THE INVENTION

The present invention provides a vacuum separator having a staggered or offset arrangement of filter sectors of the filter discs and wherein the air pressure source is connected to the filter sectors in time staggered relationship such that the air pressure tank is required to deliver airflow to fewer of the filter segments at any given time.

The present invention includes vacuum separators including an air pressure source, a pair of filter discs, each filter disc including a plurality of filter sectors, and means for alternatively connecting said air pressure source first to one of said filter sectors of one of said filter discs and subsequently to one of said filter sectors of the other of said filter discs.

One of the principal features of the invention is the provision of the vacuum separator including a rotatable cylinder supporting the filter discs for rotation, and the means for alternately connecting the air pressure source to the filter sectors includes a pair of sets of parallel fluid conduits, one of said pair of sets of conduits supported by one end of the cylinder and connected to one filter disc and the other set of conduits supported by the other end of the cylinder, and connected to another filter disc.

Another of the principal features of the invention is the provision of a pair of valve means, one of the valve means selectively and alternatively controlling air pressure from the air pressure source to one of the sets of conduits, and the other of the valve means controlling air pressure from the air pressure source to the other of the sets of conduits, and a pair of switch means each connected to the cylinder and respectively connected to the valve means for actuating the valve means upon rotation of the cylinder through a predetermined arc.

Another of the principal features of the invention is the provision of the means for alternately connecting the air pressure source to the filter sectors as further including a pair of manifolds, one of the manifolds positioned adjacent one end of the cylinder, and the other of the manifolds positioned at the other end of the cylinder, and wherein one of the sets of conduits is connected to one of the manifolds in fluid communication, and the other of the sets of conduits is connected to the other of the manifolds in fluid communication.

DESCRIPTION OF THE PREFERRED EMBODIMENT

Figure 1:
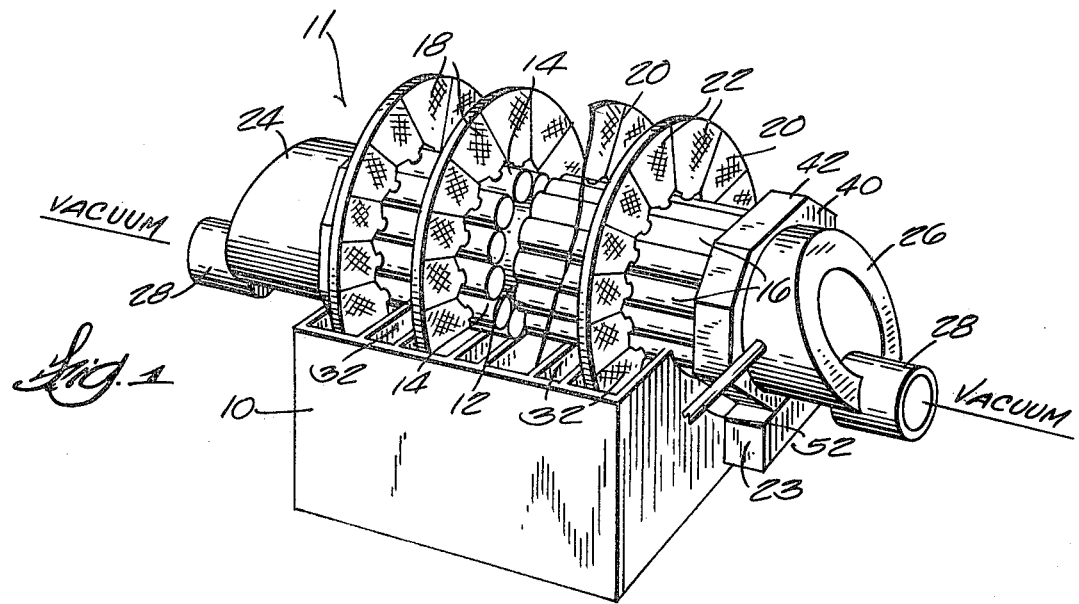
FIG. 1 is a diagrammatic perspective view of a vacuum separator embodying various of the features of the invention.

A vacuum separator 11 is diagrammatically shown in FIG. 1 as including a tank 10 for containing a slurry of solid particles such as iron ore. A main cylinder 12 is rotatably supported over the tank 10 and supports a pair of sets of filtrate vacuum tubes 14 and 16 on its outer cylindrical surface. The filtrate vacuum tubes 14 and 16, respectively, are connected to a plurality of vacuum filter discs 18 and 20 conventionally made up of sector shaped filter segments 22.

The main cylinder 12 is supported at each of its opposite ends for rotation, and the opposite ends of the main cylinder 12 are connected to vacuum manifolds 24 and 26, respectively, each connected to a vacuum source (not shown) through vacuum conduits 28. The vacuum manifolds 24 and 26 are also respectively connected to the vacuum filtrate tubes 14 and 16 in a manner to be described below.

Figure 4:
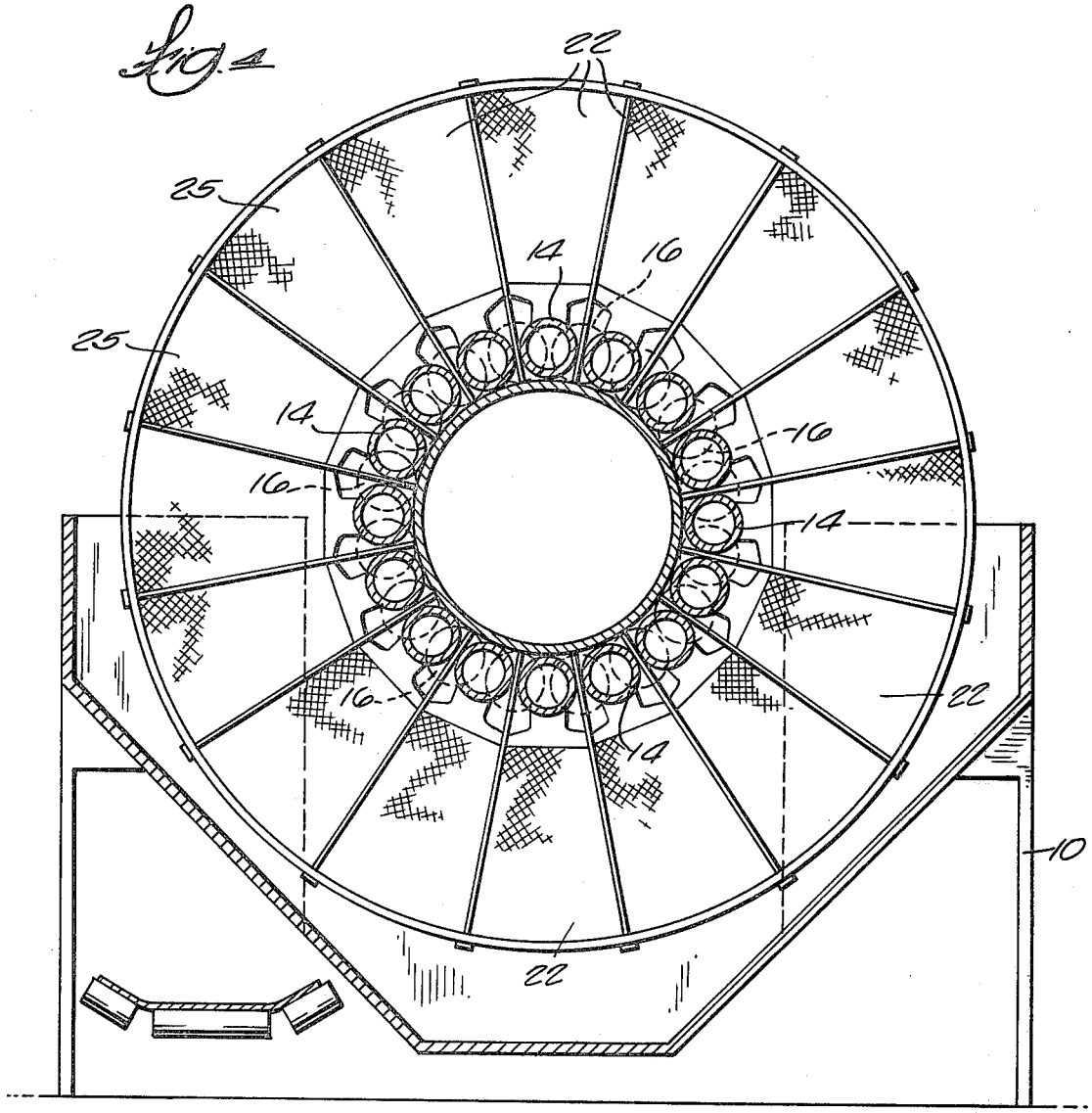
FIG. 4 is an enlarged cross-section end view of the vacuum separator shown in FIG. 1.

During operation, a drive mechanism rotates the main cylinder 12 such that the vacuum filter discs 18 and 20 are rotated through the slurry contained in the tank 10 to effect separation of solid material from the slurry. The operation of the above noted components to effect the vacuum separation of solid material from a slurry is conventional in nature and will not be described in detail. Generally, each sector shaped filter segment 22 of the filter discs 18 and 20 is covered by a porous filter medium such as a porous bag 25 and includes a central cavity. During operation, the central cavity is coupled to the vacuum source through one of the filtrate vacuum tubes 14 and 16 and a respective one of the vacuum manifolds 24 and 26 and a liquid portion of the slurry is drawn through the porous filter medium 25 of the segments 22 in the slurry. A portion of the solid particulate material in the slurry is trapped or retained on the face of the filter medium 25, thereby effecting the basic vacuum separation of the nonsoluble material from the liquid portion of the slurry. As the vacuum filter discs 18 and 20 continue to rotate about the axis of cylinder 12 in the counterclockwise direction as seen in FIG. 4, the filter segments 22 having solid material entrained on their surfaces move generally upwardly out of the slurry and continuing vacuum applied to the filter segments 22 causes air to be drawn through that solid material, at least partially drying the solid material and forming caked material on the respective surfaces of the filter segments 22.

As the filter discs 18 and 20 continue to rotate, the filtrate vacuum tubes 14 and 16 are selectively connected to an air pressure tank 30 (FIG. 5) whereby the caked solid particulate material is blown off the surface of the filter segments 22 and is received in collecting channels 32 of tank 10. The collecting channels 32 are integral with the tank 10 and are positioned closely adjacent the planar surfaces of the filter discs and below those filter segments 22 connected in fluid communication with the air pressure tank 30.

The filtrate vacuum tubes 14 are secured to the outer surface of one end of the main cylinder 12 in mutually spaced adjacent relation and parallel to the longitudinal axis of the main cylinder 12. The filtrate vacuum tubes 14 have a length approximately half that of the main cylinder 12 and are each closed at their end adjacent the middle of the main cylinder. The respective opposite ends of the filtrate vacuum tubes 14 are connected to the manifold 24.

The filtrate vacuum tubes 16 are similarly secured to the outer surface of the opposite end of the main cylinder 12 in mutually spaced adjacent relation and parallel to the longitudinal axis of the main cylinder. Like filtrate vacuum tubes 14, the filtrate tubes 16 have a length substantially equal to half the length of the main cylinder 12, and they are closed at their ends adjacent the closed ends of the filtrate tubes 14. The other ends of the filtrate tubes 16 are connected to the manifold 26.

The respective axes of the filtrate vacuum tubes 14 are mutually parallel to the axes of the filtrate vacuum tubes 16, and, as best shown in FIGS. 1 and 4, the respective axes of the tubes 14 are disposed in spaced equidistant relation between the axes of two of the tubes 16 and such that the tubes 14 are offset or staggered by one-half pitch from the tubes 16.

The manifold 24 is bolted to an octagonal plate 40 of a bearing housing 42, the bearing housing 42 in turn being rigidly supported by the frame 23. Fluid communication between the manifold 24 and the respective filtrate tubes 14 is controlled by a wear plate 34 and a parallel adjacent cut-out plate 36. The wear plate 34 is attached to the end of the main cylinder 12 for rotation therewith and includes a plurality of peripheral circumferentially spaced holes 38 therein, each of the holes 38 respectively aligned with one of the filtrate vacuum tubes 14. The cut-out plate 36 is fixed to the manifold 24 against rotation and is received against the wear plate 34 in fluid tight relation. The planar surface of the wear plate 34 received against the cut-out plate 36 is coated with a layer 35 of rubber or other resilient material to insure a fluid tight seal between wear plate 34 and cut-out plate 36. The cut-out plate 36 includes a pair of peripheral circumferential slots 44 in alignment with the holes 38 in the wear plate 34 for providing fluid communication between the vacuum manifold 24 and selected conduits 14.

The manifolds 24 and 26 each include an annular vacuum chamber 46 connected to the vacuum conduits 28 in turn connected to a vacuum source. The manifolds 24 and 26 also each include an air pressure chamber 50 separated from the annular vacuum chambers 46 and connected to the air pressure tank 30 through an air pressure conduit 52. Air pressure in the air pressure tank 30 is generated by a conventional compressor apparatus not shown.

In operation, communication between selected of the filtrate vacuum tubes 14 and 16 and the respective annular vacuum chambers 46 of manifolds 24 and 26 is provided and controlled by the cut-out plates 36 and rotation of the main cylinder 12 wherein certain of the filtrate vacuum tubes 14 and 16 are caused to be aligned with the annular slots 44 in the cut-out plates. Fluid communication between successive ones of the filtrate tubes 14 and the air pressure chamber 50 of the manifold 24 is provided by an opening 54 in the cut-out plate 36. Fluid communication between the filtrate vacuum tubes 16 and the air pressure chamber 50 of the manifold 26 is similarly provided by an opening 54 in cut-out plate 36 of manifold 26.

Figure 2:
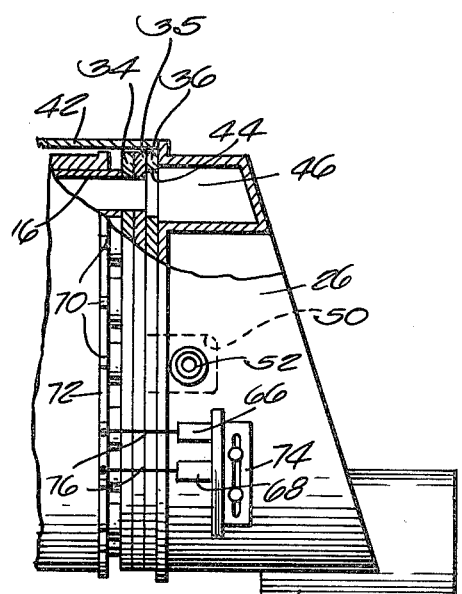
FIG. 2 is an enlarged fragmentary side elevation view of the one end of the vacuum separator shown in FIG. 1 with portions broken away in the interest of clarity.
Figure 3:
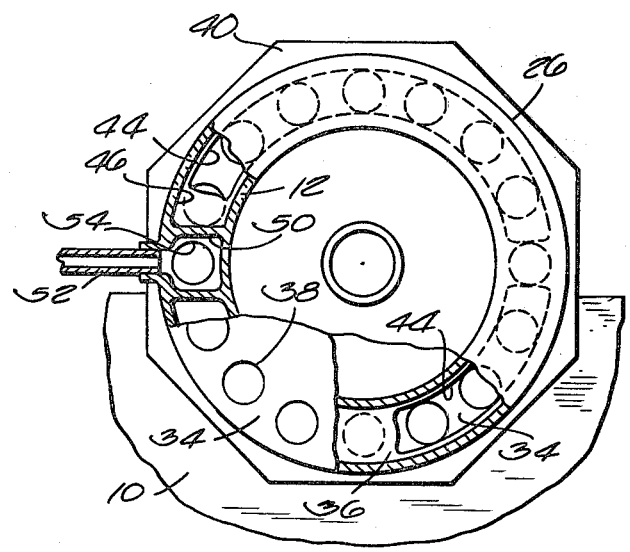
FIG. 3 is an end elevation view of the end of the vacuum separator shown in FIG. 2 with portions broken away in the interest of clarity.
Figure 5:
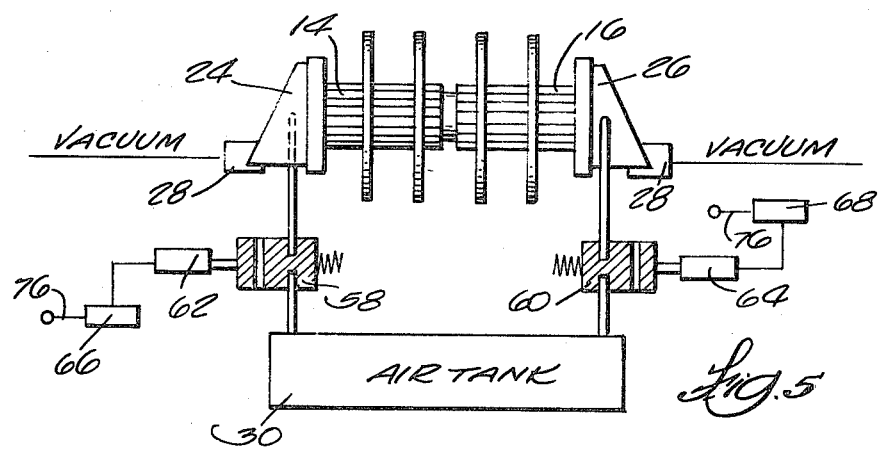
FIG. 5 is a diagrammatic view of the vaccum separator shown in FIG. 1 with a schematic view of the air pressure control means embodied in the vacuum separator of the invention.

Referring to FIG. 5, fluid communication between the air pressure tank 30 and the air pressure chambers 50 is respectively controlled by a pair of solenoid operated valves 58 and 60. The solenoid operated valves 58 and 60 are controlled by timers 62 and 64 and microswitches 66 and 68. As shown in FIG. 2, the main cylinder 12 includes a plurality of cams 70 projecting from the peripheral surface of a cam ring 72 surrounding one end of the main cylinder 12 and adjacent manifold 26. The cams 70 are circumferentially spaced apart on the cam ring 72 by a distance substantially equal to that between the respective longitudinal axes of the filtrate vacuum tubes 16. The microswitches 66 and 68 are supported by a bracket 74 and each include a switch lever 76 having a free end engageable with the cams 70 during rotation of the main cylinder 12. Rotation of the cylinder 12 causes cams 70 to engage the free ends of the microswitch levers 76 causing sequential actuation of the microswitches, each cam 70 first engaging the lever 76 of microswitch 66 and subsequently switch lever 76 of microswitch 68. The levers 76 of microswitches 66 and 68 are spaced apart by a distance approximately the distance between the longitudinal axes of conduits 14 and 16.

In operation, as the main cylinder 12 rotates, one of the cams 70 will engage lever 76 of microswitch 66 actuating the solenoid actuated valve 58 and timer 62. The valve 58 controls fluid communication between the air pressure source 30 and the air pressure chamber 50 of manifold 24. The timer 62 is functional to cause the valve 58 to remain open for a predetermined period of time, e.g. 0.2 seconds. Air pressure will be conveyed through chamber 50 and opening 54 of manifold 24 into one of the conduits 14 aligned with opening 54 to blow the caked solid material off each of the filter segments 22 connected to that conduit 14. Continued rotation of the cylinder 12 will cause cam 70 to engage lever 76 of microswitch 68 providing for communication of the air pressure source 30 with one of the conduits 16 and the filter segments 22 attached to that conduit. Subsequently, a succeeding cam 70 will engage the lever 76 of microswitch 66 providing fluid communication to the next adjacent conduit 14. The timers 62 and 64 are functional to cause valves 58 and 60, respectively, to interrupt communication of air pressure to one of the conduits 14 or 16 before air pressure is supplied to the next conduit. Accordingly, the air pressure tank communicates with only one of the conduits 14 and 16 at a time, and the required tank capacity is substantially less than would be needed to supply a suitable air pressure for the required duration to both conduits 14 and 16. As a correllary, since the air pressure tank communicates with only a limited small number of filter segments at any given time, the air pressure supplied to those filter segments for a sufficient period of time is at a sufficient pressure to blow all of the caked solid material off the surface of the filter segment thereby insuring efficient operation of the vacuum separator. It is necessary that the compressor used to supply air pressure to air pressure tank 30 be of sufficient capacity to regenerate the required air pressure in the air pressure tank 30 between each blowing cycle.

I claim:

1. A vacuum separator comprising:
   an air pressure source,
   a pair of filter discs, each filter disc including a plurality of filter sectors, and
   means for alternately connecting said air pressure source first to one of said filter sectors of one of said filter discs and subsequently to one of said filter sectors of the other of said filter discs, said connecting means including a pair of sets of parallel fluid conduits, said filter sectors of one of said filter discs being connected in fluid communication to respective ones of said fluid conduits of one of said sets of conduits and said filter sectors of said other filter disc being connected in fluid communication to respective ones of said fluid conduits of the other of said sets of fluid conduits, and means for alternately connecting said air pressure source first to at least one of said conduits of said one of said pair of sets of conduits and subsequently to at least one of said conduits of the other of said pair of sets of conduits.

2. A vacuum separator as set forth in claim 1 and further including a cylinder rotatable about a longitudinal axis, said filter discs supported by said cylinder for rotation therewith and defining a plane transverse to said longitudinal axis.

3. A vacuum separator as set forth in claim 2 wherein said cylinder has opposite ends and wherein one of said pair of sets of conduits is supported by one of said ends of said cylinder and the other of said pair of sets of conduits is supported by the other of said ends of said cylinder.

4. A vacuum separator as set forth in claim 3 wherein said one of said pair of sets of conduits are supported in mutually parallel relation on said cylinder in parallel relation to said longitudinal axis and for rotation with said cylinder around said axis, and said other of said pair of sets of conduits are supported in mutually parallel relation on said cylinder in parallel relation to said longitudinal axis and for rotation with said cylinder around said axis.

5. A vacuum separator as set forth in claim 1 wherein said means for connecting said air pressure source to said conduits further includes a pair of valve means, one of said valve means for selectively and alternatively controlling air pressure from said air pressure source to one of said sets of conduits, and the other of said valve means controlling air pressure from said air pressure source to the other of said sets of conduits, and a pair of switch means each connected to said cylinder and respectively connected to said valve means for actuating said valve means upon rotation of said cylinder through a predetermined arc.

6. A vacuum separator as set forth in claim 3 wherein said conduits of one of said pair of sets are circumferentially offset from said conduits of the other of said pair of sets.

7. A vacuum separator as set forth in claim 3 and wherein said connecting means further includes a pair of manifolds, one of said manifolds positioned adjacent one end of said cylinder, and the other of said manifolds positioned at the other end of said cylinder, and wherein one of said sets of conduits is connected to one of said manifolds in fluid communication, and the other of said sets of conduits is connected to the other of said manifolds in fluid communication.

8. A vacuum separator as set forth in claim 1 wherein said means for connecting said air pressure source to said filter sectors includes a pair of manifolds connected in fluid communication with said air pressure source, means for connecting one of said manifolds in fluid communication with one of said sets of fluid conduits, and means for connecting the other of said manifolds in fluid communication with the other of said sets of fluid conduits.

9. A vacuum separator as set forth in claim 8 wherein said means for alternately connecting said air pressure source to said filter sectors further includes a first valve means for controlling flow of air pressure from said air pressure source to one of said manifolds and a second valve means for controlling flow of air pressure from said air pressure source to the other of said manifolds.

10. A vacuum separator comprising
    a tank for containing a slurry,
    a cylinder rotatable about a longitudinal axis, said cylinder having opposite ends,
    a pair of sets of filters supported by said cylinder for rotation therewith and extendable during a portion of said rotation into said slurry, one of said sets of filters supported by one of said opposite ends and the other of said pair of sets of filters supported by the other of said opposite ends,
    at least one air pressure source, and means for alternately connecting one of said sets of said pair of sets of filters to said at least one air pressure source, and subsequently connecting the other of said sets of said pair of sets of filters to said at least one air pressure source, said connecting means including a pair of sets of parallel fluid conduits, said filter sectors of one of said sets of filter duits being connected in fluid communication to respective ones of said fluid conduits of one of said sets of conduits and said filter sectors of said other set of filters being connected in fluid communication to respective ones of said fluid conduits of the other of said sets of fluid conduits, and means for alternately connecting said air pressure source first to at least one of said conduits of said one of said pair of sets of conduits and subsequently to at least one of said conduits of the other of said pair of sets of conduits.

11. A vacuum separator as set forth in claim 10 wherein said means for alternately connecting includes a pair of manifolds connected in fluid communication with said air pressure source, one of said manifolds connected in fluid communication with one of said sets of conduits and the other of said manifolds connected in fluid communication with the other of said sets of conduits.

12. A vacuum separator as set forth in claim 11 wherein said connecting means further includes a first valve means for controlling flow of air pressure from said air pressure source to one of said manifolds and a second valve means for controlling flow of air pressure from said air pressure source to the other of said manifolds 13. A vacuum separator as set forth in claim 10 wherein one of said pair of sets of conduits is supported by one of said ends of said cylinder for rotation with said cylinder around said longitudinal axis, and the other of said pair of sets of conduits is supported by the other of said ends of said cylinder for rotation with said cylinder around said longitudinal axis.

14. A vacuum separator as set forth in claim 13 and wherein said means for alternately connecting further includes a pair of manifolds, one of said manifolds positioned adjacent one end of said cyinder, and the other of said manifolds positioned at the other end of said cylinder, and wherein one of said sets of conduits is connected to one of said manifolds in fluid communication, and the other of said sets of conduits is connected to the other of said manifolds in fluid communication.

* * * * *